US009874736B2

(12) United States Patent
Cutrale et al.

(10) Patent No.: US 9,874,736 B2
(45) Date of Patent: Jan. 23, 2018

(54) APPARATUS AND METHOD FOR AN INCLINED SINGLE PLANE IMAGING MICROSCOPE BOX (ISPIM BOX)

(71) Applicant: The Regents of the University of California, Oakland, CA (US)

(72) Inventors: Francesco Cutrale, Irvine, CA (US); Enrico Gratton, San Clemente, CA (US)

(73) Assignee: The Regents of the University of California, Oakland, CA (US)

(*) Notice: Subject to any disclaimer, the term of this patent is extended or adjusted under 35 U.S.C. 154(b) by 1047 days.

(21) Appl. No.: 13/873,159

(22) Filed: Apr. 29, 2013

(65) Prior Publication Data

US 2014/0320601 A1  Oct. 30, 2014

(51) Int. Cl.
*G02B 21/16* (2006.01)

(52) U.S. Cl.
CPC ........ *G02B 21/16* (2013.01); *G02B 2207/113* (2013.01)

(58) Field of Classification Search
CPC .......................................... G02B 21/00–21/368
USPC .................................................. 359/368–398
See application file for complete search history.

(56) References Cited

U.S. PATENT DOCUMENTS

| 5,796,112 A * | 8/1998 | Ichie | G02B 5/001 |
| | | | 250/458.1 |
| 7,218,393 B2 * | 5/2007 | Sharpe | G01N 21/6458 |
| | | | 356/244 |
| 7,692,879 B2 * | 4/2010 | Steinert | G02B 7/004 |
| | | | 359/368 |
| 9,645,378 B2 * | 5/2017 | Hilbert | G02B 21/06 |
| 2003/0228703 A1 * | 12/2003 | Hoppe | G01N 21/6428 |
| | | | 436/172 |
| 2009/0237501 A1 * | 9/2009 | Lemmer | G01N 21/6458 |
| | | | 348/79 |
| 2009/0237670 A1 * | 9/2009 | Osborne | G01N 21/648 |
| | | | 356/445 |

(Continued)

FOREIGN PATENT DOCUMENTS

WO   WO 2012/113752   *   8/2012

*Primary Examiner* — Bumsuk Won
*Assistant Examiner* — Jeffrey Madonna
(74) *Attorney, Agent, or Firm* — Marcus C. Dawes; Daniel L. Dawes

(57) ABSTRACT

An apparatus for inclined single plane Illumination microscopy of a sample includes a laser for launching excitation light beams at a plurality of wavelengths, a laser beam expander, an injection arm optically coupled to the laser beam expander, a conventional back-to-back microscope system, a universal dichroic mirror optically coupled to the injection arm to direct the excitation light beams into the conventional back-to-back microscope onto a sample plane in an imaging plane, and to receive fluorescence light from the sample, a universal optical adaptor optically coupled to the universal dichroic mirror, a re-imaging component optically coupled to the universal optical adaptor; and a camera output connector optically coupled to the re-imaging component, where the laser beam expander, injection arm, universal optical adapter, re-imaging component, and camera are combined in a modular unit which is arranged and configured to be coupled to the conventional back-to-back microscope.

7 Claims, 7 Drawing Sheets

FIG. 1D

(56) References Cited

U.S. PATENT DOCUMENTS

| | | | |
|---|---|---|---|
| 2011/0261446 A1* | 10/2011 | Dunsby | G02B 21/0076 359/380 |
| 2012/0229791 A1* | 9/2012 | Lippert | G02B 21/0032 356/23 |
| 2012/0241596 A1* | 9/2012 | Savran | G02B 21/0008 250/208.1 |
| 2013/0335818 A1* | 12/2013 | Knebel | G01N 21/6458 359/385 |
| 2014/0300958 A1* | 10/2014 | Knebel | G02B 21/0032 359/385 |
| 2014/0356876 A1* | 12/2014 | Ragan | G01N 1/06 435/6.12 |
| 2015/0168706 A1* | 6/2015 | Schweinitzer | G02B 21/367 348/80 |
| 2015/0260978 A1* | 9/2015 | Cremer | G02B 21/0004 348/79 |

* cited by examiner

APPARATUS AND METHOD FOR AN INCLINED SINGLE PLANE IMAGING MICROSCOPE BOX (ISPIM BOX)

GOVERNMENT RIGHTS

This invention was made with Government support under grant nos. GM076516 and RR003155 awarded by the Institutes of Health. The Government has certain rights in this invention.

BACKGROUND

Field of the Technology

The disclosure relates to the field of single plane Illumination microscopy (SPIM).

Description of the Prior Art

The need for fast three dimensional microscopy has increased over the years in bio-imaging facilities around the world. In order to respond to this need, use of the confocal microscope principle has been pushed to faster speed such as the spinning disk technology (Nipkow disk optimizations) and fast laser scanning microscopes.

Recently, another technique has been proposed, selective plane illumination microscopy (SPIM), a method based on illumination of the sample from the side with a sheet of light. The original idea was described in 1903 (Siedentopf and Zsigmondy, 1903) and pioneered in 1993 (Voie et al., 1993) with the orthogonal plane fluorescence optical sectioning (OPFOS). It was subsequently re-described in a modern incarnation by Huisken et al (2004) who proposed a practical basic setup for SPIM systems.

Techniques like SPIM, generally called light-sheet microscopy techniques, are gaining popularity because of the high efficiency in accessing volumetric information of the specimen while minimizing photo-bleaching and energy load. For this reason multiple labs have focused on the development of light-sheet microscopy with higher efficiency and introducing specific advantages. Working on the OPFOS idea, Buytaert (Buytaert and Dirckx, 2007) developed high-resolution orthogonal-plane fluorescence optical sectioning (HROPFOS) with the main advantage of a translating thinner light-sheet. Holekamp et al (2008) with their Objective Coupled Planar Illumination microscopy (OCPI) develop a single-sided light-sheet illumination mounted on the detection lens. The same principle of lateral sectioning through light-sheet was then optimized for large samples with ultramicroscopy by Dodt et al (Dodt et al., 2007) where dual sided light-sheet illumination is implemented and Multidirectional SPIM (mSPIM) by Huisken (Huisken and Stainier, 2007). These developments separate the use of SPIM for large and small specimens establishing the use of cylindrical lenses-shaped beam for large samples while objective-coupled excitation beam as in digital scanned laser light-sheet fluorescence microscopy (DSLM) by Keller et al (2008) was prevailing for small samples.

A further development of the SPIM method was proposed by the application of Bessel beams to light sheet microscopy by Planchon et al (Planchon et al., 2011). Their system was not based on cylindrical lenses but rather on a swept-light-sheet obtained by rapidly shifting the Bessel beam on the plane of interest. Despite the innovations in excitation modality and pattern in these designs, the perpendicularity between excitation and collection objectives is maintained, following the main SPIM original design.

A different path was proposed by Tokunaga et al (2008) with the highly Inclined and laminated optical sheet microscopy (HILO). Using the same single objective lens the system excites the sample with an oblique light sheet and collects the emitted fluorescence. The main important differences of this method with respect to the SPIM classical formulation reside in the geometry of illumination/detection on the sample. The 90 degrees angle between excitation and collected beams is substituted by a misalignment of emitting plane and focal plane of the objective. The main drawback of HILO resides in the narrow field of view (FOV) due to severe defocusing affecting the regions of the sample depending on the distance from the central focusing line.

Following this idea Dunsby (Dunsby, 2008) developed the oblique plane microscope (OPM) that overcomes the limitation of the narrow FOV of HILO. The inspiration comes from the work of Botcherby et al (Botcherby et al., 2008) that solves the issue of aberration of images collected at positions out of the focal plane using a refocusing method before the detector. The application of this optical arrangement to HILO overcomes the limitation of the defocusing problem related to the inclined illumination.

Single plane Illumination microscopy (SPIM) was known since the 1930s. It was recently redescribed in a modern incarnation by J. Colombelli, S. W. Grill, and E. H. K. Stelzer, Rev. Sci. Instrum. 75, 472 (2004) in which two separate objectives were used, one to produce the light sheet and the other to collect the fluorescence at 90 degrees. This method rapidly gained importance in the bioimaging field due to its sensitivity and low photophysical damage. However SPIM as described by Stelzer requires the construction of a nonconventional microscope and a particular preparation of the sample that must be inserted in a rotating capillary in between the two objectives.

Fast three dimensional microcopy images can be obtained using a spinning disk technology and some very fast laser scanning microscopes. Both approaches are based on the principle of the confocal microscope. In single plane illumination microscopy (SPIM) the sample is excited with a light sheet obtained with an objective and a cylindrical lens. The fluorescence is detected with a second objective at 90 degrees with respect to the objective used for excitation. The increased efficiency and reduced cost of SPIM is attracting widespread interest from the scientific community. SPIM systems lead to high throughput since data are easily shifted from the acquisition of the single plane to volumetric display.

Another major advantage of SPIM with respect to the confocal arrangement is reduced photobleaching. SPIM is currently not widespread due to the lack of commercial systems. In the current SPIM system samples need to be prepared within a narrow capillary which prevents the applicability of SPIM to dish based cell cultures (the most used sample preparation modality in cell microscopy).

Based on the light sheet illumination principle, oblique plane microscope (OPM) was described by Dunsby in US Patent Publication 2011/0261446 incorporated herein by reference. In the OPM implementation the sample is illuminated in an oblique manner and fluorescence light is collected through the same microscope objective used for excitation. The image is then subsequently tilted using two objectives external to the microscope body and focused into a camera detector. The OPM design still requires a custom constructed microscope.

The problem of fast volumetric acquisition was solved using spinning disc confocal microscopy (or Nipkow disc). The main disadvantages to overcome are the following. Spinning disc technology is based on confocal microscopy therefore the entire sample is illuminated and through a pinhole array only the section of interest is imaged. This causes high photo-bleaching, energy load and phototoxicity with a low efficiency of the system. Rotation of the disc causes gyroscopic effect which affects images when acquired at high speed Nipkow disc pinhole size is fixed. As a consequence the signal to noise ratio decreases notably with the increase of the z-position. Excitation field is not uniform due to construction. The problem is overcome using SPIM or OPM but with the aforementioned disadvantages, in particular both systems need to be home built, thus microscopy development knowledge is necessary.

BRIEF SUMMARY

The illustrated embodiments of the invention are directed to a variant of SPIM that has all the advantages of the SPIM technology including that it can operate on samples prepared with standard protocols including dish cell cultures. In illustrated embodiments of the invention we disclose a SPIM system in which the light sheet is produced at an angle. Our setup can be installed as an add-on into any standard commercial microscope. It uses only one objective lens in proximity of the sample and a second objective along the emission path. These embodiments allow us to use standard modalities for sample preparation and insertion while the SPIM effect is done elsewhere in the microscope, far from the sample. Since the light goes through the sample at an angle, we called these embodiments the iSPIM (inclined SPIM).

The main use of the iSPM Box of the illustrated embodiments is microscopy imaging, in particular for three dimensional volumetric acquisition. It is also possible to perform fluorescence correlation spectroscopy (FCS) on the images acquired. The inclined single plane illumination microscopy (iSPIM) box is a single-sided add-on module that allows user to perform iSPIM on virtually any microscope body. The system is intended for imaging biological samples with a fast volumetric acquisition to produce three dimensional images. It finds application in any bioimaging related field that makes use of fluorescence for imaging. iSPIM is based on the single plane illumination microscopy principle. It uses a cylindrical lens to create a thin laser sheet which optically sections the sample with high efficiency of light illumination and detection. As a consequence of this high efficiency the sample undergoes a consistently reduced photo-bleach and energy load. The acquisition speed of the system is the highest among microscopy systems.

In the illustrated embodiments of the invention we incorporate all the optics necessary for the OPM in a single box that can be used as an add-on to existing commercial microscopes. We named this design the inclined single plane illumination microscopy box (iSPIM box). It maintains the same advantage of OPM over original SPIM which are: conventional sample preparation techniques, e.g. glass microscope slides and cell culture dishes may be used; minimal photobleaching, phototoxicity and energy load of the sample; no moving parts required to obtain a two dimensional image-good for imaging dynamics; no calculation required to get sectioned image; good three dimensional imaging when combined with a motorized xy-stage to position the sample The limitation of OPM which requires the construction of a new microscope body is lacking in the iSPIM box construction. The iSPIM box makes the SPIM principle available to a large community of microscopists. The components necessary for performing OPM are contained in a small size box and prealigned. Using an optical adaptor, the box can be plugged in any commercial body microscope. Therefore construction of the system is simplified and the iSPIM box can be used in all research fields which make use of commercial microscopes.

Another advantage of the iSPIM box over OPM is the automation of the system, in particular for acquisition. The stage is not only motorized but also programmable. The stage commonly found in commercial microscopes is the only moving component and is used for moving the sample over the sectioning laser sheet. An array of positions can be easily programmed on the stage thus upon reaching desired position an electronic trigger is sent from the stage controller unit to the camera device for synchronizing acquisition. A microscope software suite has been programmed to simplify this process. The easily obtained sequence of sections is then assembled into a volumetric dataset.

Advantages of iSPIM Box over Nipkow disc based microscopy systems include: only the section of interest is illuminated, consequently efficiency of the system increases and photo-bleaching, photo-toxicity, energy load decrease consistently; two-photon excitation can be used to exploit modern large frame-fast cameras (scMOS); no gyroscopic noise is present no pinhole is used, thus signal to noise ratio is constant along z-position excitation field is uniform; and no calculation is necessary to obtain a sectioned image.

Advantages of iSPIM Box over single plane imaging microscopy (SPIM) system include: construction complexity is reduced; only one objective close to the sample is necessary, thus higher numerical aperture can be used which increases light collection efficiency; no particular sample preparation is necessary, thus standard cell imaging is possible; and there is no necessity to home build the microscope system.

Advantages of iSPIM Box over oblique plane microscopy (OPM) system include: construction is simplified; no microscopy development knowledge is necessary for setting up the microscope; components are pre-aligned in the box; box can be connected to commercial body microscopes with universal optical adaptor; system automation, acquisition is simplified and optimized in speed through use of programmable stage and camera; triggered acquisition mosaic (tiled) acquisition is implemented; and software with intuitive graphical user interface (GUI) simplifies microscope control.

More particularly the illustrated embodiments of the invention include an apparatus for inclined single plane Illumination microscopy of a sample. The apparatus includes a laser for launching excitation light beams at a plurality of wavelengths. However, it is to be expressly understood that the laser could be separately supplied by the user and combined with the following elements. A laser beam expander is provided for expanding the excitation light beams optically. An injection arm is optically coupled to the laser beam expander. A conventional back-to-back microscope system having an first excitation objective and a second collection objective is provided. A universal dichroic mirror is optically coupled to the injection arm to direct the excitation light beams into the conventional back-to-back microscope's first excitation objective onto a sample plane in an imaging plane, and to receive fluorescence light from the sample through the conventional back-to-back microscope objective. A universal optical adaptor has a second collection objective and a third collection objective optically coupled to the universal dichroic mirror. A re-imaging component optically is coupled to the universal optical adaptor. A camera is optically coupled to the re-imaging component. The laser beam expander, injection arm, universal optical adapter, re-imaging component, and camera are combined in a modular unit which is arranged and configured to be coupled to the conventional back-to-back microscope and without perpendicularity between the second and third objectives. However, it is to be expressly understood that the camera could be supplied separately by the user and the above combination of elements could be provided with a camera connector in place of the camera.

In one of the illustrated embodiments of the invention, the excitation light is provided by a laser with output beams with a wavelength of 488 nm and 436 nm.

In another one of the illustrated embodiments of the invention, the laser beam is expanded using a beam expander comprised of matching achromatic doublet lenses. The beam expander comprises two mirrors and is connected to a metal base mounted on a manual stage providing vertical translation.

In one of the illustrated embodiments of the invention, the injection arm comprises a metal base, a cylindrical lens and a focusing achromatic lens mounted on to the metal base to ensure pre-aligned optics to maintain a precise distance determined by the foci of the cylindrical lens and focusing achromatic lens for inserting a light sheet into the conventional back-to-back microscope.

In another one of the illustrated embodiments of the invention, the dichroic mirror comprises a beam splitter.

In one of the illustrated embodiments of the invention, the injection arm and the beam expander are mounted together on a linear manual stage base that allows the horizontal movement of the injection arm and the beam expander.

In another one of the illustrated embodiments of the invention, fluorescent emission light from the sample is refocused using the first excitation objective and a second collection objective of the back-to-back microscope and third collection objective chosen according to an aberration-free rule so that the chosen magnification equals the ratio of $n_1/n_2$, where $n_1$ is the refraction index of an immersion medium used with the sample and $n_2$ is the refraction index of the second collection objective.

In one of the illustrated embodiments of the invention, the a re-imaging component comprises a tilted component including a lens turret with a plurality of selectable objectives optically coupled to an achromatic doublet lens which focuses an image on the camera to allow a user to choose among a corresponding plurality of magnifications, depending on typology of the sample.

In another one of the illustrated embodiments of the invention, the conventional back-to-back microscope system comprises a microscope stage which is programmable, where a light sheet position and angle coupled by the excitation objective onto the sample are fixed and the only moving component is the microscope stage used for scanning the sample. The microscope stage is programmed to perform an array scan with size, distance and array cell dwell time being customizable.

The illustrated embodiments of the invention include a method of operation of the above apparatus.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

BRIEF DESCRIPTION OF THE DRAWINGS

FIG. 3c is a 280 frame stack; and FIG. 3d a 361 frame stack.

FIG. 4a, 4c show the comparison of images of live MMT cell line acquired with confocal and FIG. 4b, 4d show the iSPIM image. FIGS. 4a and 4b represent the x-z view. FIGS. 4c and 4d show the view of x-y plane.

Figure 1A:
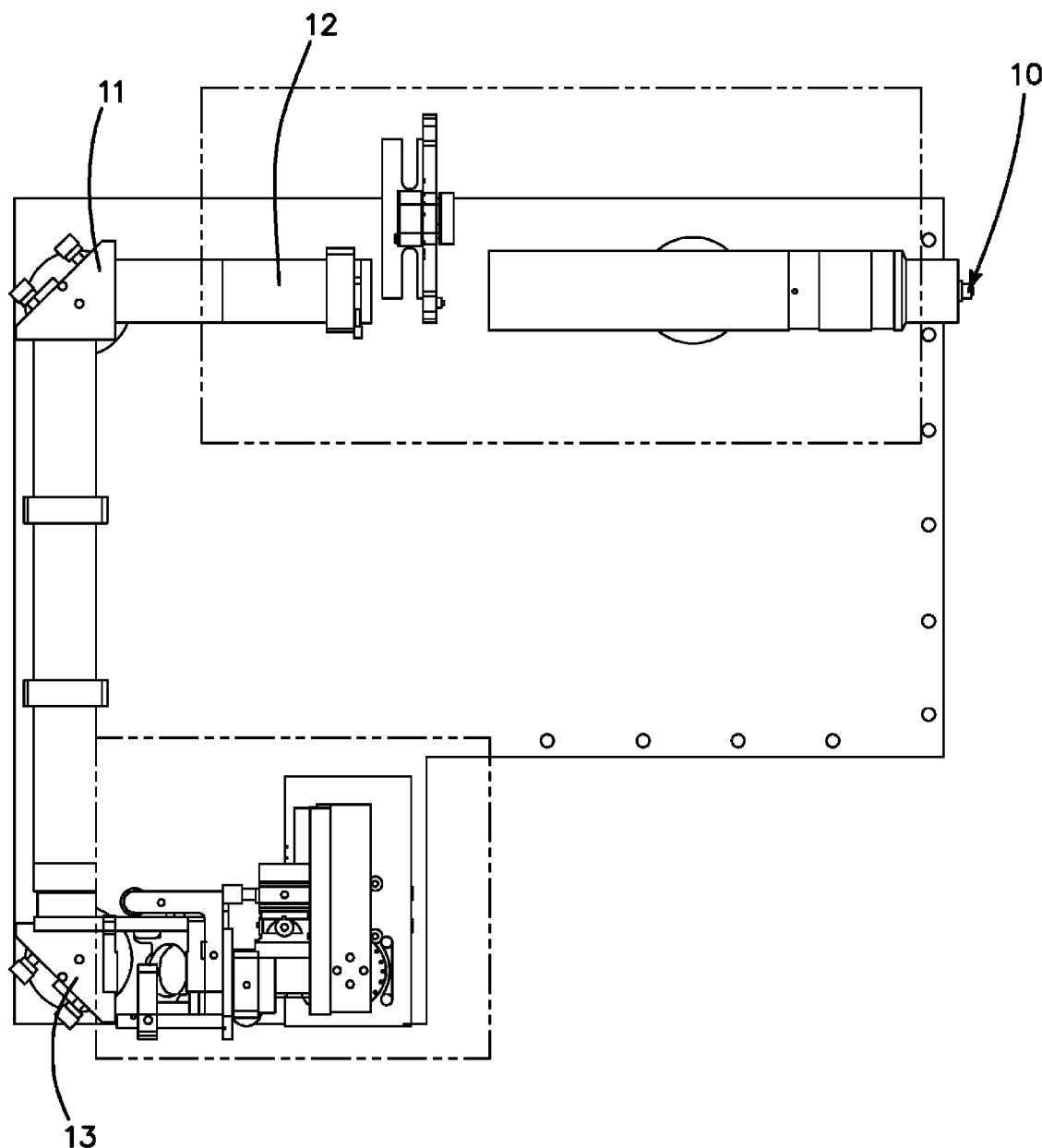
FIG. 1a is a top plan view of the layout of the illustrated embodiment of the invention.
Figure 1B:
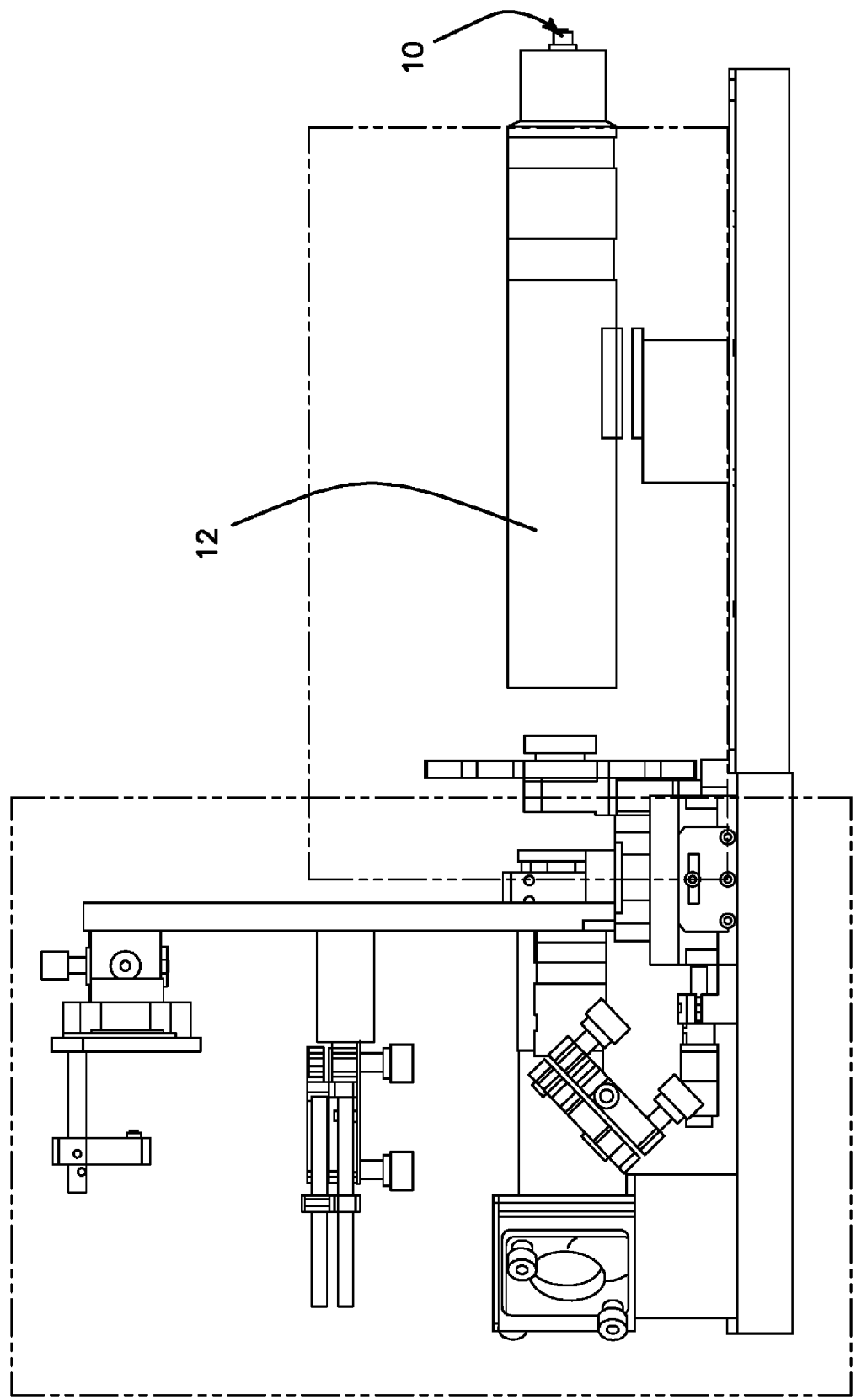
FIG. 1b is a side plan view of the layout of the illustrated embodiment of the invention.
Figure 1C:
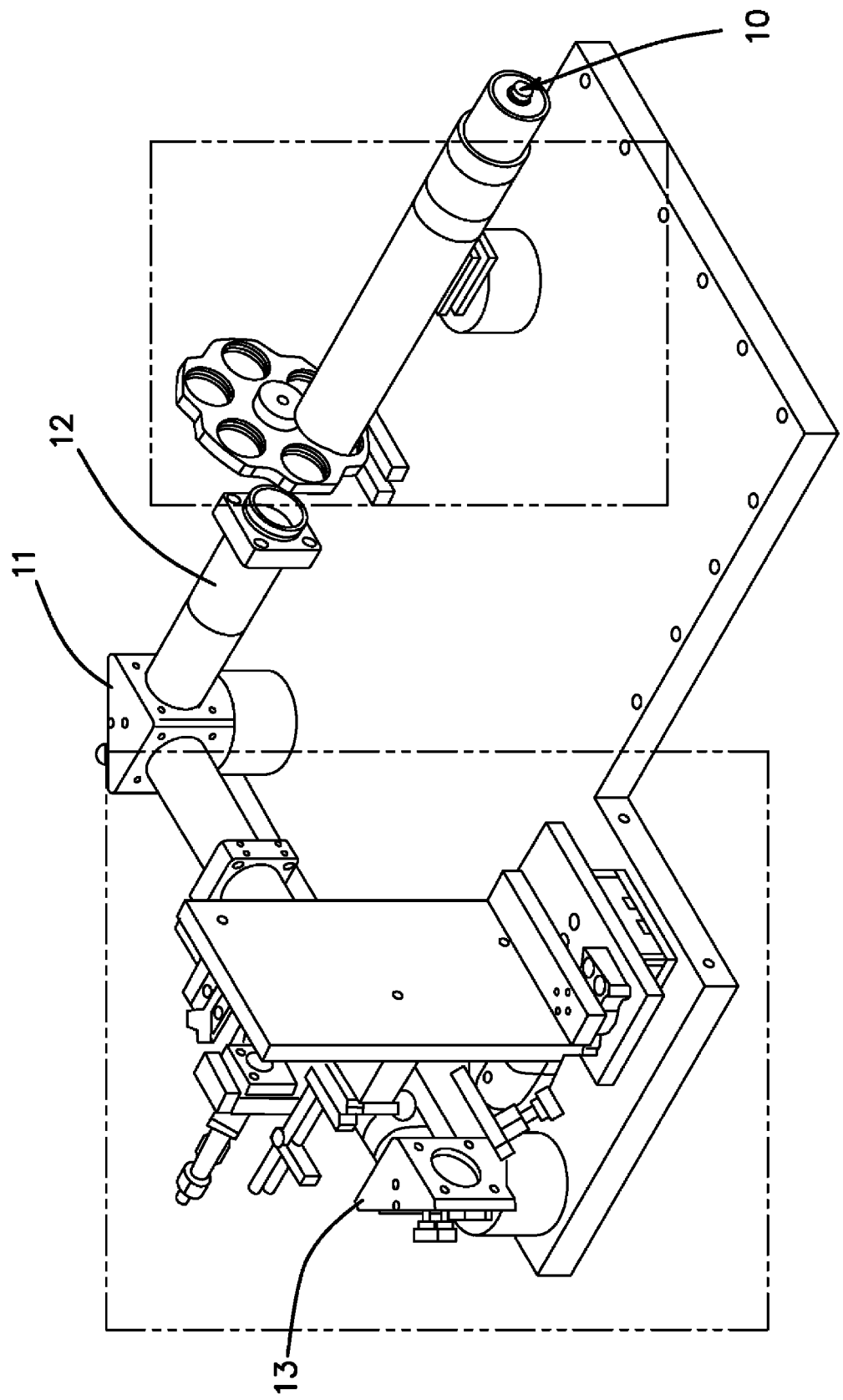
FIG. 1c is a perspective view of the layout of the illustrated embodiment of the invention.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

The disclosed system for inclined selective plane illumination microscope (iSPIM) with shares the advantages of OPM and that can be used as an add-on to commonly used microscopes, such as a conventional IX-71 Olympus microscope, simplifying the construction of the OPM and increasing performance of a conventional microscope. As shown below in the diagrammatic depictions of FIGS. 1a-1d the primary components include: a laser input connector or laser 10, a beam expanding component 12, an universal dichroic component 13 to separate fluorescence from excitation light, an universal optical adaptor 14, a re-imaging component 15, and a camera output connector 16.

Figure 1D:
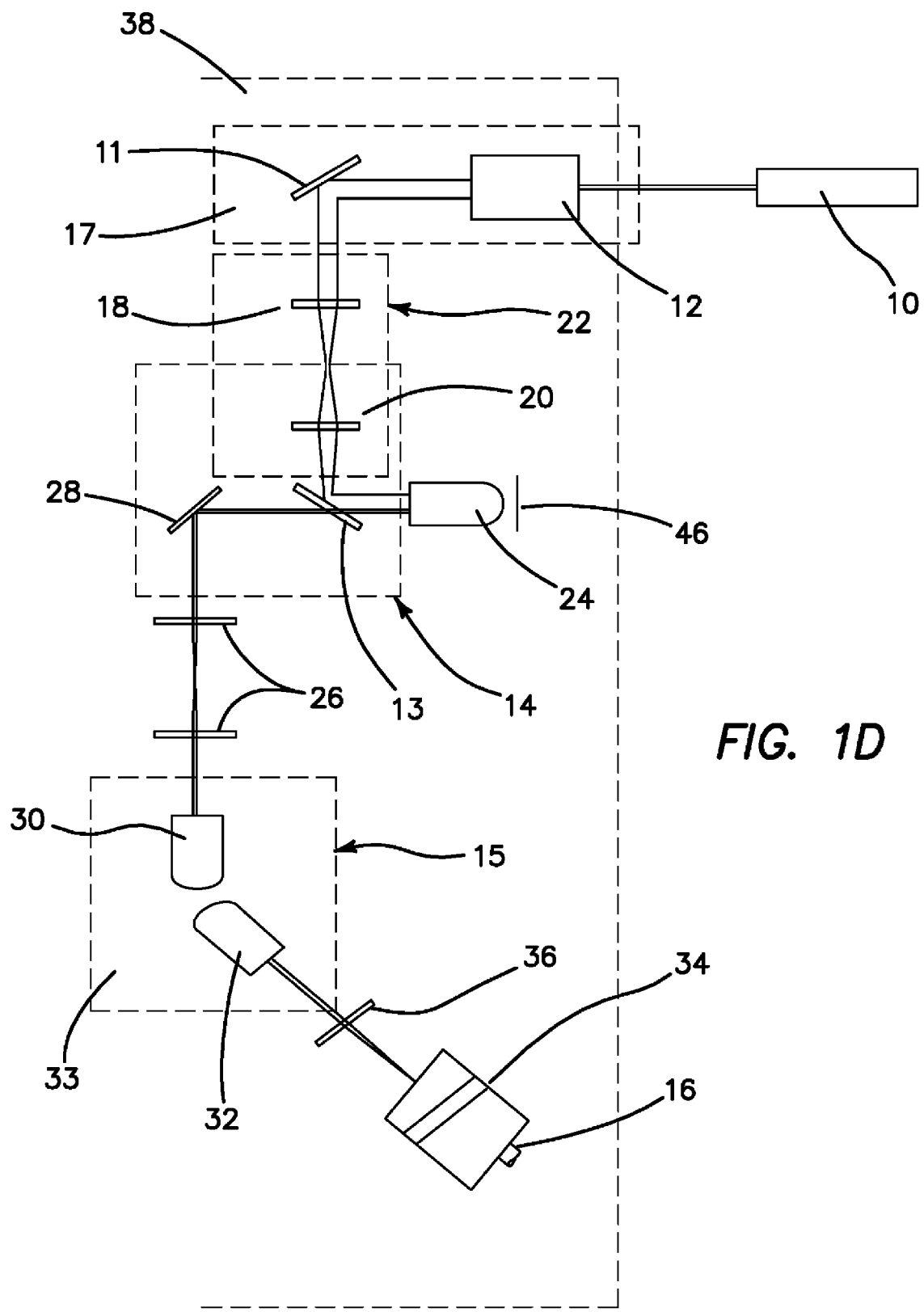
FIG. 1d is a diagrammatic view of the illustrated embodiment of the invention.

FIG. 1d is a typical setup of an iSPIM. Laser beam from laser 10 is inserted into a 10.times. beam expander 12 and reflected by a mirror 11 both mounted on a vertically moving component 17. Cylindrical lens 18 and achromatic doublet 20 are mounted on the "injection arm" 22, part of the moving component 17. The dichroic mirror 13 reflects the beam vertically into the back aperture of the objective 24 which is directed in turn onto specimen 46. The emission light collected through objective 24 is reflected out of the body microscope, redirected by mirror 28 into a tube containing two achromatic doublet lenses 26. The virtual image is formed after the second objective 30. Objective 32 is mounted on an objective wheel 33. Virtual plane light is collected and the resulting image is focused on the camera 34 through tube lens 36.

More specifically the excitation light is provided by a laser launcher 10 (ISS, Champaign Ill.) at 488 nm and 436 nm. The laser beam is expanded (×10) using a custom beam expander 12 built with matching achromatic doublet lenses (Achromatic Doublet Lens 5 mm Dia.×10 mm FL, MgF2 Coating and Achromatic Doublet Lens 25 mm Dia.×100 mm FL, MgF2 Coating NT32-327, Edmund Optics, Karlsruhe, Germany). Component 12, with two mirrors, is connected to a metal base mounted on a vertical manual stage 17.

The "injection arm" 22 includes a cylindrical lens 18 and a focusing achromatic lens 20 (Edmund Optics, Lens Ctrl 10.times.20.times 75 mm FL VIS-NIR, Lens Ach 25.times.75 mm MgF2 TS) on to the same metal base 22. This ensures the pre-aligned optics to maintain the precise distance of the 150 mm determined by the lenses focuses. Furthermore it also serves as optical adaptor for inserting the light sheet in a commercial body microscope, in this case an IX-71 Olympus, at the correct offset from the center of the objective backaperture to obtain the correct output angle from the microscope. The apochromatic lens 20 in fact refocuses the light on to the back aperture of the microscope objective 24. The dichroic mirror 13 used is a beam splitter 20/80 (21008 20/80 Beam splitter, Chroma). The "injection arm" 22 and the assembly 17 containing the vertically moving beam expander 12 are mounted on a linear manual stage base 38 that allows the horizontal movement of the elements mounted on or coupled to stage base 38. Mounted on stage base 38 are mirror 11 and assembly 17.

The emission light is refocused using a back-to-back microscope system comprised of the first objective 24 (UPlanApo 60×/1.35 oil immersion, Olympus) and lens 26, lens 36 and the second objective 30 (UPlanApo 40×/0.85 air objective, Olympus). The objectives 24 and 30 are chosen according to the aberration-free rule from Botcherby (Botcherby et al., 2008), thus the chosen magnification must equal the ratio of $n_1/n_2$, where $n_1$ is the refraction index of the immersion medium of the specimen and $n_2$ is the refraction index of the second objective 30. Since the first objective 24 is an oil objective, the magnification is chosen to be 1.5×.

The tilted component includes a lens turret (not shown) with a third objective selected from those mounted on the lens turret, such as 40× (LucplFln 40×/.60 air objective, Olympus) and a 10×(UPlanApo 10/.40 air objective, collectively denoted by objective 32, Olympus) followed by an achromatic doublet lens 36 (Edmund Optics, Lens Ach 50×350 MgF2 TS) which focuses the image on the sensor of an EMCCD camera 34 (Evolve 512, Photometrics, Tucson, Ariz.). This allows the user to choose among two magnifications, depending on typology of specimen.

The microscope stage 14 in use is programmable (Applied Scientific Instruments, MS-2000 Eugene, Oreg.). Since the light sheet position and angle are fixed, the only moving component is the stage 14. This is used for scanning through the sample.

The stage 14 has been programmed to perform an array scan. Size, distance and array cell dwell time are customizable. Upon reaching a new position the stage 14 sends a TTL pulse to the trigger port of the camera 34, initializing acquisition. The camera 34, set to image in triggered mode, outputs a TTL pulse when reaching 'frame readout'. In a feedback loop this pulse is used to activate stage motion to the next position.

The acquisition algorithm, written in Matlab with C++, optimizes acquisition times considering exposure time, read out, dwell time and time to reach next position on the stage. The acquisition protocol has been simplified by programming a user friendly graphical user interface that guides the user along the acquisition steps. Algorithms for mosaic/tiled acquisition have been implemented. Other acquisition schemes can be readily accommodated in the illustrated embodiments.

The full width half maximum (FWHM) of the light sheet on the sample is 2.6 μm whereas the confocal parameter is 80 μm.

Figure 2:
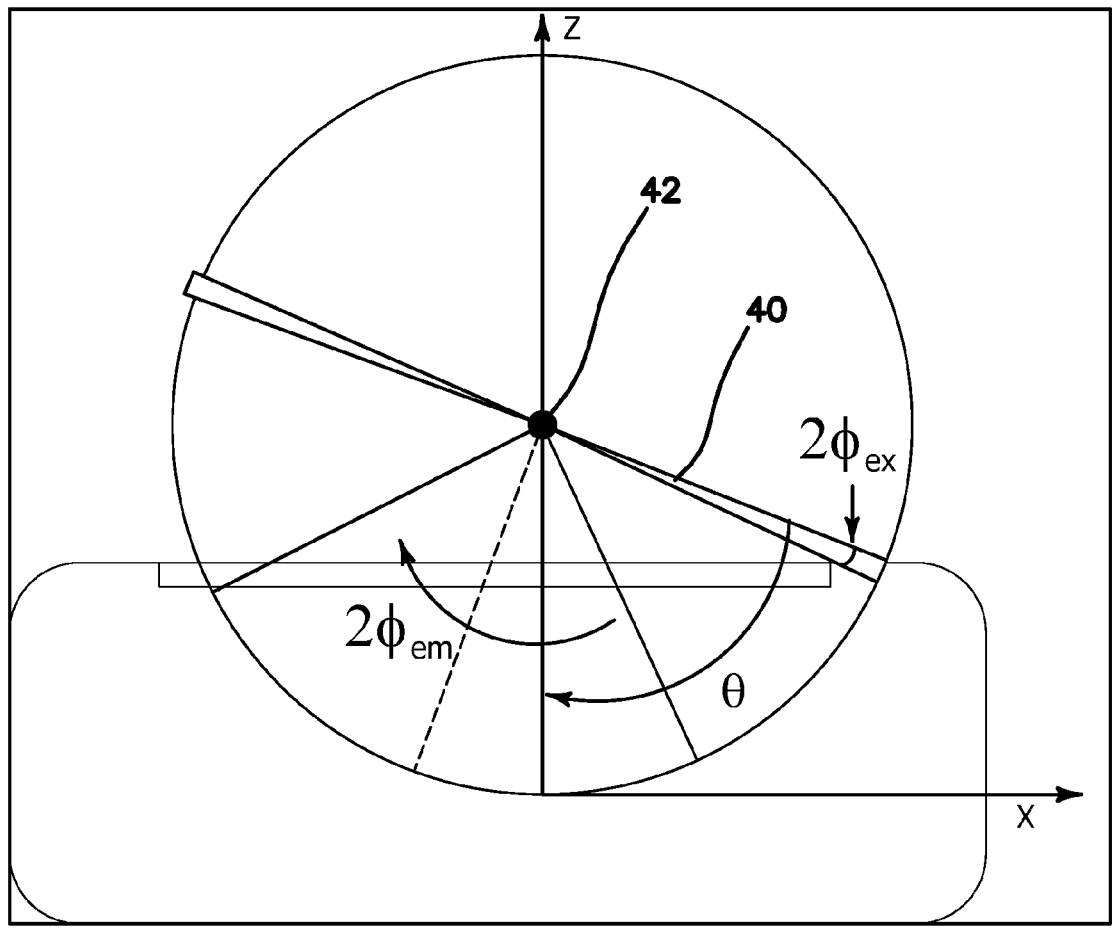
FIG. 2 is a diagram depicting a geometrical model for the excitation angle.

FIG. 2 is a diagram depicting a geometrical model for the excitation angle. A geometrical model for excitation angle, acceptance angle and emission (Dunsby, 2008) is presented in FIG. 2, where θ is the acceptance angle of the first objective, $\varphi_{ex}$ the half angle of the excitation sheet, $\varphi_{em}$ the half angle of the emission. An objective lens is represented with acceptance angle 8. The light sheet 40 has a half angle of the excitation $\varphi_{ex}$. The sample 42 has a half angle of emission $\varphi_{em}$. Considering illumination and collection separated by π/2 it is possible to obtain the equation (Dunsby, 2008):

$$\Phi_{em} = 2\theta - \Phi_{ex} - \frac{\pi}{2}$$

From the definition of numerical aperture (NA), with non-fluorescent oil refractive index n=1.479 (Cargille Oil) the value of $\theta_{obj1}$=73.7 deg. Consequently, being $\varphi_{ex}$=3 deg the equation above gives $\varphi_{em}$=54.4 deg. The potential NA of the system, considering only the first objective 24 is $NA_{potential}$=1.20.

One issue outlined also by Dunsby is that the limiting factor in the NA of the system is located in the refocusing part with the third objective 32. In this setup the real NA obtained are 0.88 for the objective 32, LucplFln 40×/.60 and 0.59 for the UPlanApo 10/.40 as the two options for objective 32. This value considers the fact that the last objective image is the already magnified sample from the second objective 30.

The angle subtended by the laser sheet with the first objective, a, is set to be 30 degrees whereas the FWHM of the focal spot is 344 nm.

As a proof of operability, samples of MMT cell line (American Type Culture Collection, CCL-51) transfected with H2B-EGFP are prepared on standard culture dishes (MatTek, Ashland, Mass.) coated with fibronectin. Cells are imaged live after overnight seeding and further fixed. Fixation is done with PFA (Paraformaldehyde) and mounting media (polyvinyl alcohol mounting medium with DABCO, antifading—10981) for further sampling. Imaging is performed using 488 nm laser and shifting the sample with the stage movement. The dataset is then corrected for the acquisition geometry, shearing the frames accordingly. Rendering is performed using Amira, (San Diego, Calif.).

FIGS. 3a-3d are images of live MMT H2B-EGFP acquired with iSPIM with a step size of 0.5 μm. The fluorescence signal derives from the nucleus. Renderings are in color, whereas reference section slices are in grayscale.

Figure 3:
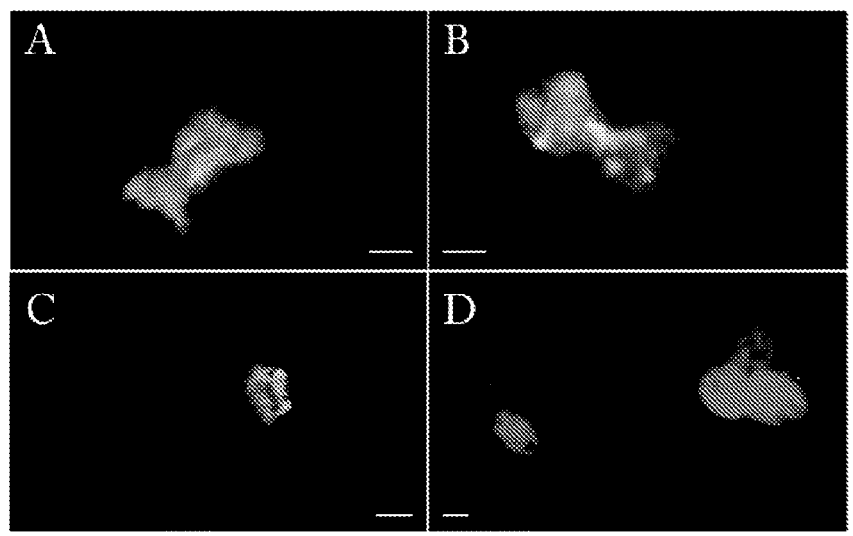
FIGS. 3a-3d are images of live MMT cell line acquired with iSPIM. Scale bars are 10 μm in FIGS. 3a and 3b, which is a which is a 98 frame stack.

Scale bars are 10 µm in FIGS. 3a and 3b, which is a 98 frames stack; FIG. 3c is a 280 frames stack; and FIG. 3d a 361 frames stack.

Figure 4:
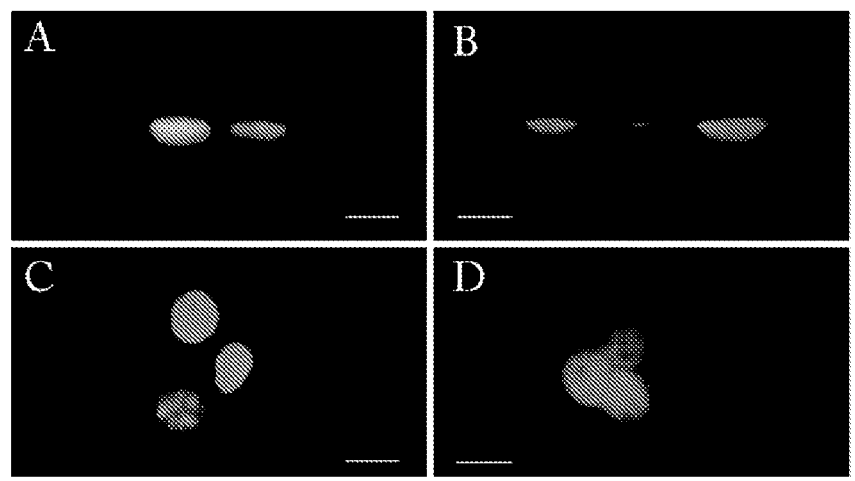
FIGS. 4a-4d area comparison with confocal images of the same sample collected with Olympus FV1000 using comparable optical settings to iSPIM.

A comparison with confocal images of the same sample collected with Olympus FV1000 using comparable optical settings to iSPIM is shown in FIGS. 4a-4d. Comparison of images of live MMT H2B-EGFP acquired with confocal (FIG. 4a, 4c) and iSPIM (FIG. 4b, 4d). Scale bars are 20 µm. FIGS. 4a and 4b represent the x-z view. The lateral resolution observed is comparable to confocal. FIGS. 4c and 4d show the view of x-y plane. The advantage of gray levels of camera-based acquisition is noticeable. The confocal acquisition is performed using comparable settings to the iSPIM system and considering that the zooming function of a confocal microscope is not applicable to a SPIM system.

It is possible to distinguish structures inside the nucleus on the intensity based volumetric representation. For proper understanding, one of the sections, in gray scale, is shown in the rendering. This section is a 30 degrees angle section of the sample.

Figure 5:
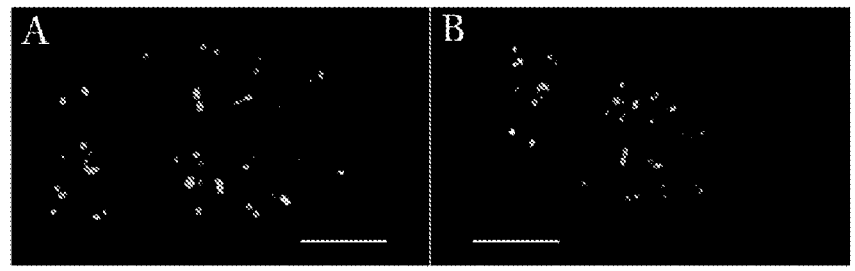
FIGS. 5a and 5b show the mosaic capability of the system a tiled acquisition of 9012 frames full frame resolution (512 by 512 pixels) acquired with iSPIM. Scale bar is 100 μm.

Furthermore, to show the mosaic capability of the system a tiled acquisition of 9012 frames full frame resolution (512 by 512 pixels) is performed. Images are then stitched, shifted and rendered. The area covered is 842 µm by 442 µm. The resulting image is shown in FIG. 5, which is a mosaic of 9012 frames 512×512 pixels acquired with iSPIM. Scale bar is 100 µm. Due to size issues dataset has been down sampled a factor of 2 to allow visualization. FIG. 5a is a vertical view; and FIG. 5b is an inclined view with reference plane resulting from stitched frames. The fluorescence image corresponds to single cell nuclei. The resulting images show appreciable resolution that, in consideration of the acquisition speed, and demonstrate the potential of this imaging method. The mosaic size of 9012 frames results in a manageable raw file of 4.6 GB which after stitching and shifting, considering 30% overlap and conversion to TIFF format, weights 4 GB, yielding 2061×1273×751 volumetric pixel size.

As shown by the images in the figures, iSPIM has the capability of sectioning the sample with a simple linear translation of the specimen over the light sheet. The only moving component in the setup is in fact the stage 14. This setup still shows extensive optics as in Dunsby's prototype. Nevertheless the system has improved stability and simplified alignment. Once aligned the components do not require any further movement. Critical alignment points are the laser sheet insertion into the microscope and the tilting component between the second and third objective. To simplify the insertion of the excitation light, the block 38 containing vertically moving mirror 11, beam expander 12 and secondary mirror 28, together with the block of the "injection arm" 22 have been pre-aligned and mounted on a single axis manual translation stage 38. It is critical that the light sheet has the correct angle subtended with the first objective lens 24. This angle depends on the entrance angle of the beam on the back aperture of the objective 24.

A simple rule arises from geometrical considerations. Moving the light sheet on the x-y plane of the microscope system will change the exit angle of the beam from the objective 24. Altering the z-position will shift the exit position on the objective lens 24. Therefore moving the single axis manual translation stage 38 will alter the exit angle. The mirror 11, along with beam expander 12 and secondary mirror 28 in this block is installed on a kinematic mirror mount 38, thus it is possible to move the beam along the z-axis and consequently change the exit position.

The tilting component, the interface between the re-imaged light sheet and the camera acquisition, is another important alignment point of the system. The addition of the objective wheel and thus the possibility to change the final magnification, increases the demand for a simplified and quick repositioning of the third objective 32. The solution adopted in this setup is to uncouple the block 33 with third objective 32 from the camera arm 34. The filter wheel is mounted on an x-y-z manual translation stage 33. As a consequence switching between objectives 32 and adjusting for different working distance is performed with reduced time expense.

Figure 6:
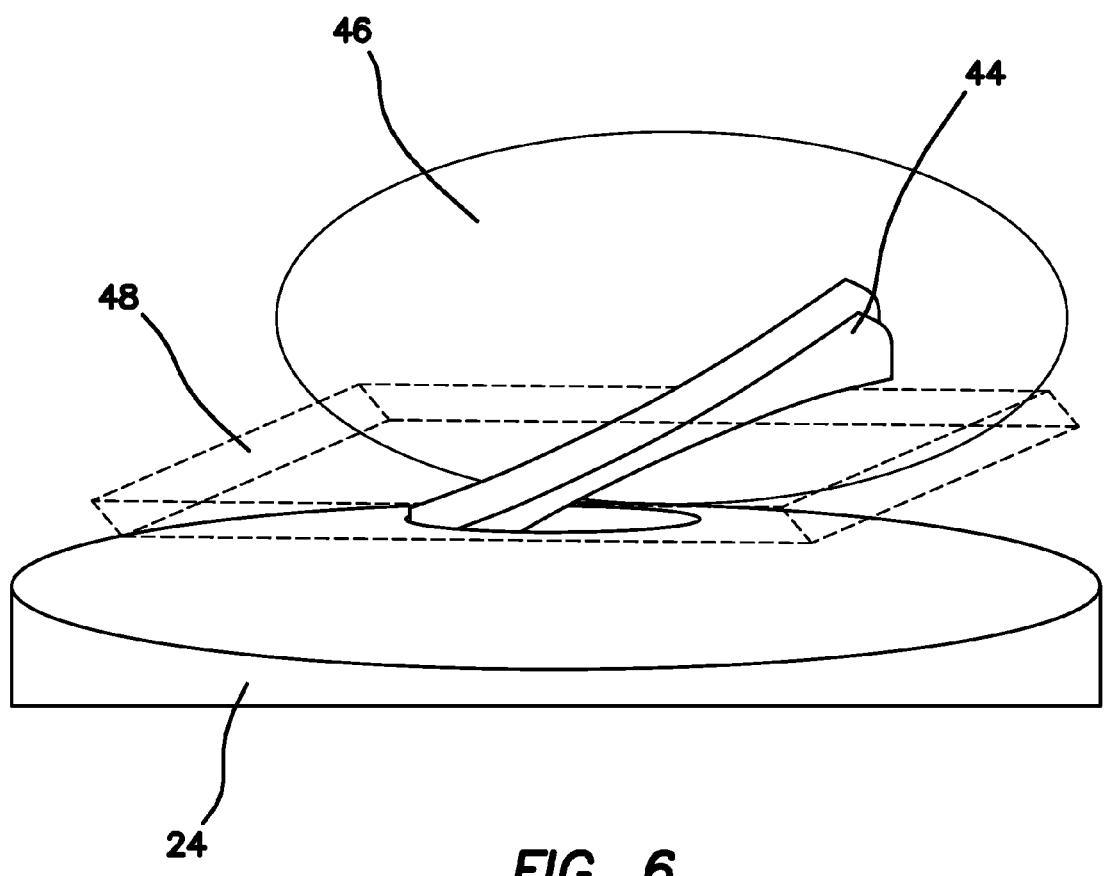
FIG. 6 is an isometric representation of outlining the volumetric acquisition of the specimen through iSPIM.

FIG. 6 outlines the volumetric acquisition through iSPIM. The image represents an objective 24 with inclined light sheet excitation 44 exiting the lens 24. The specimen 46 placed over the objective 24 is thus sectioned by the excitation light yielding a real volume 48 subtended by the inclined light sheet, that is a three dimensional parallelogram. A relevant point regards the three dimensional data acquired. The camera device 34 continuously acquires data in a single sequenced-not-spaced vector. As a consequence when the raw data is rendered the resulting volume is cubical. Considering the acquisition setup, the physical volume has a parallelogram shape in cross-section. It is then necessary to post-process the data shifting each frame accordingly to render the correct physical volume (FIG. 5).

Mosaic acquisition is achieved through programming of the MS-2000 ASI stage controller so that an array can be acquired with custom chosen overlap. A serpentine mode has been used to optimize acquisition time. The frames collected are then stitched using the fast algorithm developed by Preibisch et al (Preibisch et al., 2009) implemented in FIJI (ImageJ). The final composite image is then processed for volumetric rendering. This process, due to the number of frames collected, consistently increases the size of the final data file. One common problem in the field is related to a huge dataset volumetric representation. A possible solution is the increase of random access memory of the computer in use. On the other hand with the increasing size of camera chipsets and the upgraded acquisition speed, a constant increase in datasets can be expected.

Even though iSPIM data acquired did not exceed 16 GB, thus was within the RAM limits of the workstation, it is within the scope of the invention to provide an algorithm for subsampling the image resolution to different level of zoom.

The illustrated embodiments of the invention show an inclined selective plane illumination device as an adaptor for commercial or conventional body microscopes. As for the original oblique plane microscope (Dunsby, 2008) it carries the same advantages of SPIM systems, but with simplified mechanical component and through-the-objective TIRF-like operation. It furthermore allows the user to maintain standard sample preparation and standard horizontal positioning of the sample.

The results presented demonstrate the potential of the system when applied to cellular imaging. The capability to acquire volumetric information by simply translating the sample in a direction and the iteration of this to form of mosaic is shown in the images.

The competing limiting factors are camera acquisition speed, camera pixel size and stage movement speed. Using Sci-CMOS cameras could allow higher acquisition speed with reduced pixel dimension, increasing the resolution but with the trade off of a lower sensitivity. Optimization of stage movement, considering still time during exposure and acceleration value during camera readout will also decrease acquisition time.

The optomechanical design is enhanced to provide simplified alignment among the critical points of the system, defining an increased stability of the system. The optical components are chosen with the perspective of multicolor imaging, yielding the possibility to image multiple channels.

Furthermore our inclined embodiment is fully compatible with 2-photon excitation which could increase the system illumination efficiency with an augmented penetration in the sample.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

The words used in this specification to describe the invention and its, various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in must be understood as being generic to all possible meanings supported by the specification and by the word itself.

The definitions of the words or elements of the following invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments below or that a single element may be substituted for two or more elements in a claim.

Insubstantial changes from the claimed subject matter as viewed by a person with ordinary skill in the art, now known or later devised, are expressly contemplated as being equivalently within the scope of the invention and its various embodiments. Therefore, obvious substitutions now or later known to one with ordinary skill in the art are defined to be within the scope of the defined elements.

The invention and its various embodiments are thus to be understood to include what is specifically illustrated and described above, what is conceptionally equivalent, what can be obviously substituted and also what essentially incorporates the essential idea of the invention.

We claim:

1. An add-on module for combination with a microscope system to provide for inclined single plane Illumination microscopy (iSPIM) of a sample comprising:

a first linear stage base to provide for translation in a first direction;

a second linear stage base for translation in a second direction perpendicular to the first direction;

a laser for launching excitation light beams at a plurality of wavelengths;

a laser beam expander optically coupled to the laser and mounted on the first linear manual stage base for optically expanding the excitation light beams and movable in the first direction;

an injection arm optically coupled to the laser beam expander, the injection arm comprising a base, a cylindrical lens mounted onto the base and a focusing achromatic lens mounted onto the base to ensure pre-aligned optics to maintain a precise fixed focal distance determined by the foci of the cylindrical lens and focusing achromatic lens for inserting a light sheet into the microscope system at the desired angle;

a single objective lens optically coupled to the injection arm in proximity to the sample; where the injection arm and the beam expander, wherein the beam expander is mounted on the first linear stage, are both mounted on the second linear stage base to allow collective movement of the injection arm and the beam expander in the second direction for matching focal length of the single objective lens and optical alignment therewith; and an optical adapter optically coupled to the injection arm to direct the excitation light beams into the single objective lens and to direct emission light from the sample into the microscope system having an inclined, single-plane illumination image of the sample.

2. The add-on module of claim 1 where the first direction is the vertical direction and where the second direction is the horizontal direction.

3. The add-on module of claim 1 where the laser beam expander is optically disposed directly adjacent to the laser.

4. The add-on module of claim 1 where the laser beam expander comprises matching achromatic doublet lenses.

5. The add-on module of claim 1 where the laser beam expander comprises two mirrors and is connected to the second linear stage base for providing manual vertical translation.

6. The add-on module of claim 1 where the injection arm and the beam expander are mounted together on a linear manual stage base that allows collective horizontal movement of the injection arm and the beam expander.

7. The add-on module of claim 1 where the microscope system includes a microscope stage programmed to perform an array scan with size, distance and array cell dwell time being customizable.

* * * * *